United States Patent
Rossow et al.

[11] Patent Number: 6,030,169
[45] Date of Patent: Feb. 29, 2000

[54] REMOTE ATTACHMENT CONTROL DEVICE FOR POWER MACHINE

[75] Inventors: Scott R. Rossow, Kindred; Kenneth A. Brandt, Wyndmere; Wally L. Kaczmarski, Lisbon; Paul A. Anderson, West Fargo, all of N. Dak.

[73] Assignee: Clark Equipment Company, Woodcliff Lake, N.J.

[21] Appl. No.: 09/130,986

[22] Filed: Aug. 7, 1998

[51] Int. Cl.[7] .......................... B66C 23/00; B60K 28/04; B60K 26/02; H01H 47/00
[52] U.S. Cl. .......................... 414/680; 180/273; 180/324; 307/10.6; 307/115; 307/125
[58] Field of Search ..................... 414/680, 685; 180/315, 321, 323, 324, 271, 272, 273; 307/10.1, 10.3, 10.6, 112, 113, 115, 116, 125, 126, 130, 131, 134, 139, 143

[56] References Cited

U.S. PATENT DOCUMENTS

| | | | |
|---|---|---|---|
| 4,356,711 | 11/1982 | Theurer | 104/7 B |
| 4,459,591 | 7/1984 | Haubner et al. | 340/825.57 |
| 4,516,655 | 5/1985 | Donahue et al. | 414/687 |
| 4,980,681 | 12/1990 | Noel | 340/825.69 |
| 5,050,700 | 9/1991 | Kim | 180/272 |
| 5,265,686 | 11/1993 | Machen | 180/169 |
| 5,481,078 | 1/1996 | Asche | 307/10.1 |
| 5,486,724 | 1/1996 | Periou et al. | 307/10.1 |
| 5,546,683 | 8/1996 | Clark | 37/468 |
| 5,551,524 | 9/1996 | Yamamoto et al. | 180/6.62 |
| 5,596,319 | 1/1997 | Spry | 340/903 |
| 5,646,461 | 7/1997 | Kubota | 307/10.6 |
| 5,680,099 | 10/1997 | Springston | 340/461 |
| 5,931,254 | 8/1999 | Loraas et al. | 180/272 |
| 5,942,988 | 8/1999 | Snyder et al. | 307/10.1 |

*Primary Examiner*—Robert P. Olszewski
*Assistant Examiner*—Bryan Jaketic
*Attorney, Agent, or Firm*—Wesman, Champlin & Kelly P.A.

[57] ABSTRACT

The present invention provides an attachment for use with a power machine. An attachment control device includes an ignition switch and a stop switch and allows a user to operate the attachment from outside the operator compartment of the power machine, when the power machine is started from the attachment control device.

20 Claims, 4 Drawing Sheets

REMOTE ATTACHMENT CONTROL DEVICE FOR POWER MACHINE

INCORPORATION BY REFERENCE

The following patents are hereby fully incorporated by reference:

U.S. Pat. No. 5,425,431, issued Jun. 20, 1995, entitled "INTERLOCK CONTROL SYSTEM FOR POWER MACHINE," is incorporated herein by reference; and U.S. Pat. No. 5,577,876, issued Nov. 26, 1996, entitled "HYDRAULIC INTERLOCK SYSTEM," is incorporated herein by reference, both assigned to the same assignee as the present invention.

BACKGROUND OF THE INVENTION

The present invention deals with a power machine. More specifically, the present invention deals with a power machine having an attachment with a control device for controlling the attachment.

Power machines, such as skid steer loaders, typically have a frame which supports a cab or an operator compartment and a movable lift arm which, in turn, supports a work tool such as a bucket, an auger, a tree spade, or other work tool. The movable lift arm is pivotally coupled to the frame of the skid steer loader and is powered by power actuators which are commonly hydraulic cylinders. In addition, the tool is coupled to the lift arm and is powered by one or more additional power actuators which are also commonly hydraulic cylinders. An operator manipulating a skid steer loader raises and lowers the lift arm, and manipulates the tool, by actuating the hydraulic cylinders coupled to the lift arm, and the hydraulic cylinders coupled to the tool.

With a front attachment (or tool) such as a tree spade, cement mixer, etc., which utilizes one or more hydraulic actuators, a number of valves must typically be added to the hydraulic system of the skid steer loader in order to control the flow of hydraulic fluid under pressure to the plurality of cylinders on the attachment. In the past, the addition of these valves has required the addition of mounting hardware on the skid steer loader. For example, in some prior skid steer loaders, the valve bank used to control the hydraulic actuators on the attachment was mounted on the doorway of the cab or operator compartment. This required the hydraulic fluid under pressure to be routed to that valve bank, and then out to the attachment.

It is also common for control levers in skid steer loaders to have hand grips which support a plurality of buttons or actuable switches, actuable by the operator to perform certain functions. Depending on the particular type of attachment or attachments mounted on the skid steer loader, certain functions may be disabled or unusable. Further, depending on the particular type of attachment or attachments mounted on the skid steer loader, certain combinations of inputs from the operator input devices, when performed simultaneously, can result in opposing control valves being opened. This essentially provides an equal amount of pressurized fluid to both sides of a hydraulic actuator or hydraulic motor.

SUMMARY OF THE INVENTION

The present invention provides an attachment for use with a power machine. An attachment control device includes an ignition switch and a stop switch and allows a user to operate the attachment from outside the operator compartment of the power machine, when the power machine is started from the attachment control device.

DETAILED DESCRIPTION OF THE PREFERRED EMBODIMENTS

Figure 1:
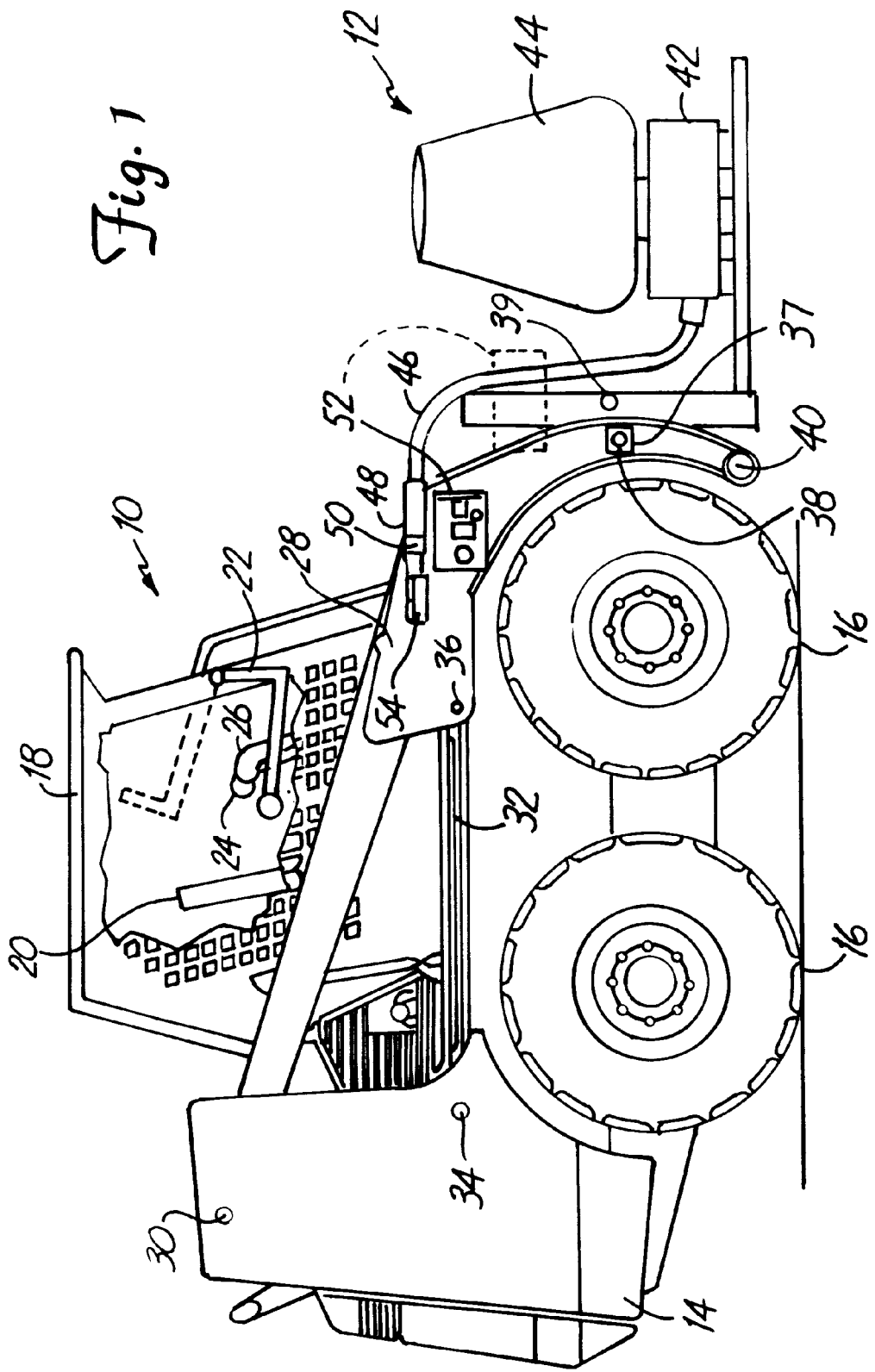
FIG. 1 is a side view of a skid steer loader with a cement mixer attachment.

FIG. 1 is a side elevational view of a skid steer loader 10 having an attachment 12 in accordance with one aspect of the present invention. Skid steer loader 10 includes a frame 14 supported by wheels 16. Frame 14 also supports a cab 18 which defines an operator compartment and which substantially encloses a seat 20 on which an operator sits to control skid steer loader 10. A seat bar 22 is pivotally coupled to a portion of cab 18. When the operator occupies seat 20, the operator then pivots seat bar 22 from the raised position (shown in phantom in FIG. 1) to a lowered position shown in FIG. 1. Cab 18 also typically includes a pair of control levers 24 and 26 with associated hand grips. Control levers 24 and 26 include actuable inputs (such as rocker switches, buttons or other operator input devices) for providing input signals.

A lift arm 28 is coupled to frame 14 at pivot points 30. A pair of hydraulic cylinders 32 (only one of which is shown in FIG. 1) are pivotally coupled to frame 14 at pivot points 34 and to lift arm 28 at pivot points 36. Lift arm 28 is coupled to attachment (such as a cement mixer) 12 by a tilt cylinder 37 which is coupled to lift arm 28 at point 38 and to attachment 12 at point 39. Attachment 12 is also illustratively attached to lift arm 28 at pivot point 40 or by any other suitable connection. Therefore, as tilt cylinder 37 is lengthened and shortened, cement mixer 12 can be tilted forward and back, respectively.

Cement mixer 12 includes hydraulic motor 42 and barrel 44. Motor 42 is coupled to barrel 44 by a direct drive connection, or a suitable chain drive or other mechanical drive linkage. Hydraulic motor 42 is coupled to the hydraulic power system of skid steer loader 10 through a set of hoses or conduits 46. Hoses 46 are coupled to attachment valve 48 by a suitable coupling such as a quick connect coupling. Valve 48 is, in turn, coupled to one or more hydraulic coupling devices 50 which receive fluid under pressure from the hydraulic power system of skid steer loader 10. Couplings 50 may, for example, be the front auxiliary hydraulic couplings provided on skid steer loader 10. Also, while valve 48 is illustrated in FIG. 1 as being mounted on loader 10, it can also be mounted on attachment 12. Illustratively, for handheld attachments, valve 48 is mounted on machine 10 while for other non-handheld attachments, valve 48 is mounted to the attachment 12.

Provision of hydraulic fluid under pressure of valve 48, and control of valve 48, can be accomplished in one of two ways. First, control can be accomplished through actuator inputs on levers 24 and 26 from within cab 18. Alternatively, control can be accomplished from outside cab 18 based on inputs received from remote attachment control device 52.

Figure 3:
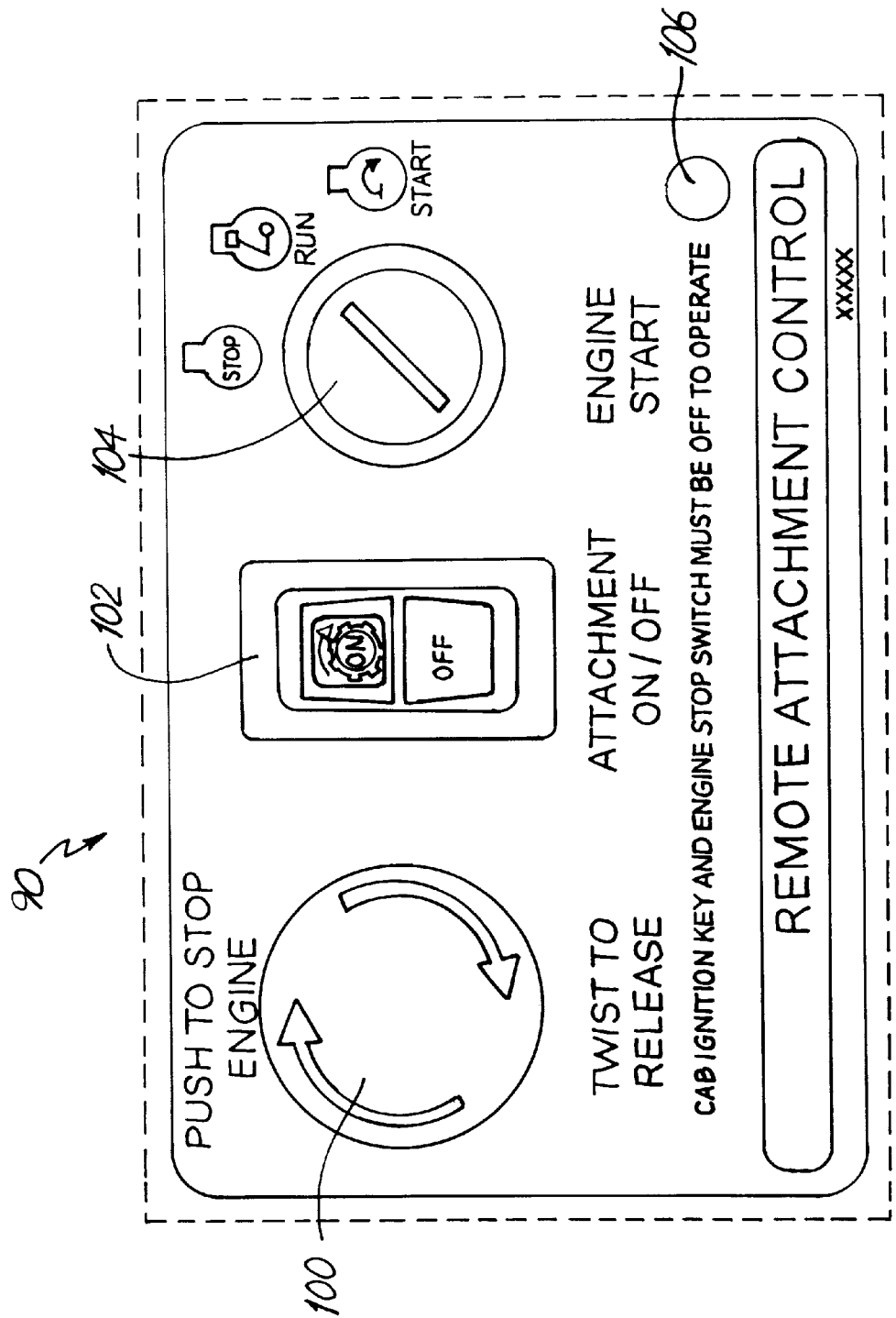
FIG. 3 illustrates an operator interface control panel in accordance with one aspect of the present invention.

Device 52, in one illustrative embodiment, is mounted to the frame of loader 10 and includes a plurality of operator inputs on a display panel thereof (shown in more detail in FIG. 3). Device 52, in another illustrative embodiment, is mounted directly to the attachment (as shown in phantom in FIG. 1). Device 52 provides an output to solenoid valve 48 for enabling the flow of hydraulic fluid through conduit 46 to hydraulic motor 42. Control device 52 is also coupled, through electrical connectors 54 and an electrical harness coupled thereto, to the electrical control system in skid steer loader 10.

In accordance with one aspect of the present invention, control device 52 can be operated by an operator from the outside of cab 18. In such an embodiment, loader 10 is illustratively started through manipulating inputs to control device 52. Attachment 12 and motor 42 can then be controlled through control device 52.

Alternatively, in accordance with another aspect of the present invention, loader 10 and attachment 12 can be operated in a two-person mode. In that embodiment, one operator is seated in seat 20, with seat bar 22 in the lowered position. Loader 10 is then started from cab 18. Hydraulic fluid flow is provided from loader 10 to attachment 12 based on control inputs from the operator inside cab 18. However, control device 52 can be used to stop the flow of pressurized fluid to attachment 12. These modes of operation are discussed in greater detail later in the application.

Figure 2:
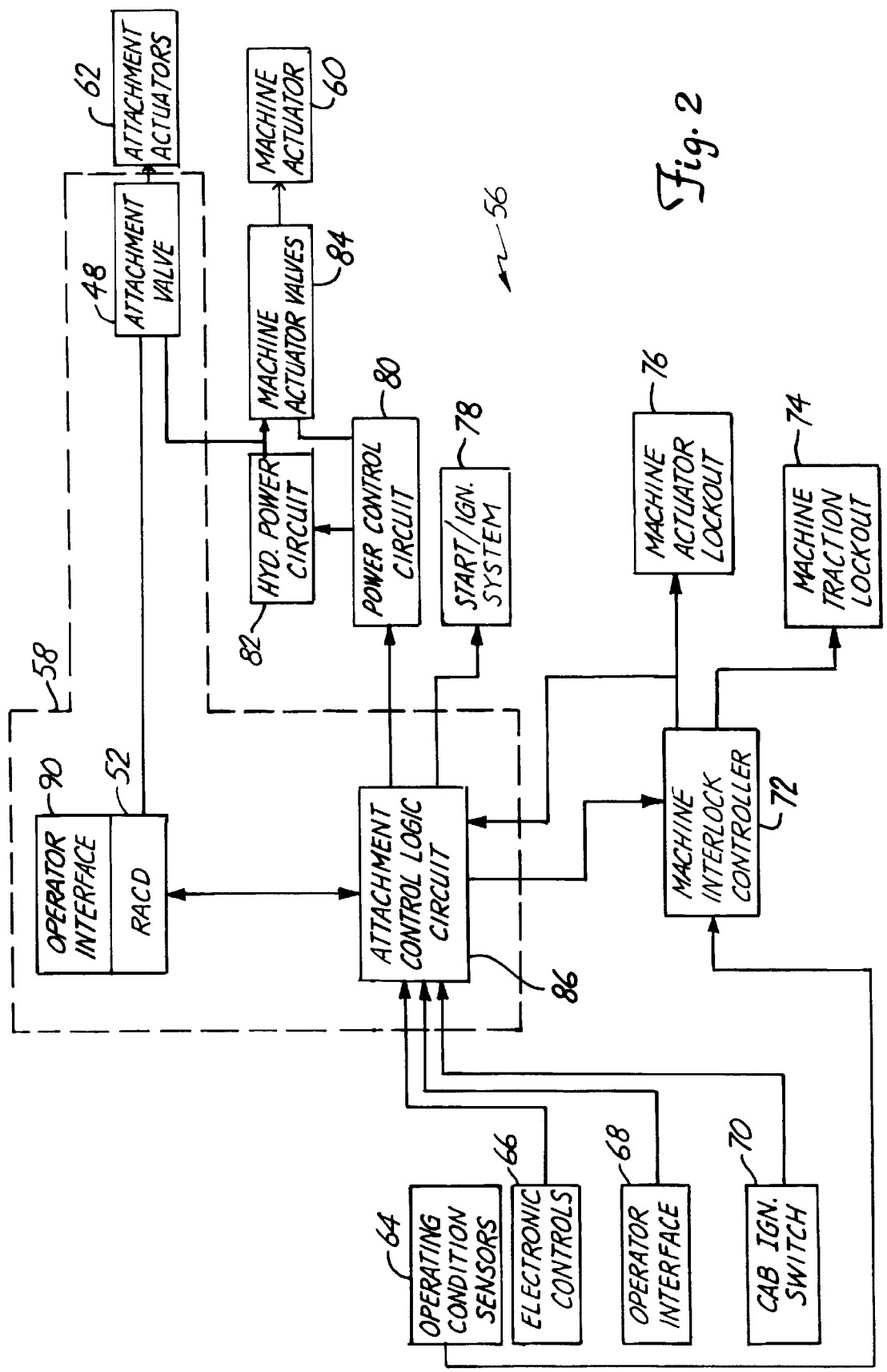
FIG. 2 is a block diagram of a control system controlling the cement mixer attachment shown in FIG. 1.

FIG. 2 is a block diagram of a control circuit for controlling loader 10 and attachment 12 in accordance with one aspect of the present invention. The control circuit illustrated in FIG. 2 includes a machine control circuit 56 and attachment control circuit 58. FIG. 2 also illustrates machine actuators 60 (which in one illustrative embodiment include actuators 32) and attachment actuators 62 (which in one illustrative embodiment include hydraulic motor 42). Machine control circuit 56 includes operating condition sensors 64, electronic controls 66, operator interface 68, cab ignition switch 70, machine interlock controller 72, machine traction lockout system 74, machine actuator lockout system 76, machine start/ignition system 78, power control circuit 80, hydraulic power circuit 82 and machine actuator vales 84. Attachment control circuit 58 includes attachment control logic circuit 86, remote attachment control device 52 (also shown in FIG. 1) and attachment solenoid valve 48 (also shown in FIG. 1).

Operating condition sensors 64 preferably include sensors for sensing desired operator conditions of loader 10. Such sensors can include sensors which provide signals indicative of the position of seat bar 22, and sensors which provide signals indicative of the presence of an operator in seat 20. Such sensors are described in greater detail in U.S. Pat. Nos. 5,425,431 and 5,577,876, both of which are incorporated above by reference. Briefly, such sensors preferably include Hall effect, infra-red, or other suitable sensors which provide an output signal to machine interlock controller 72 which is indicative of the sensed parameter. Based on those signals, machine interlock controller 72 controls functionality of skid steer loader 10 and the attachment 12 associated therewith.

Machine interlock controller 72 illustratively includes a digital computer or other suitable microcontroller. Machine interlock controller 72 receives inputs from the various input mechanisms and controls the functionality of skid steer loader 10.

Electronic controls 66 provide signals indicative of operator inputs from within cab 18. Such electronic controls can include, for example, hand grips on levers 24 and 26, switches or buttons or other operator input devices associated with the hand grips 24 and 26, operator inputs from foot pedals within cab 18, inputs from membrane or keypad inputs provided in cab 18, or any other suitable operator input devices.

Operator interface 68 preferably provides a visual or audible indication to the operator which indicates the desired operator conditions or operating characteristics sensed in the machine or the associated attachment 12. Operator interface 68 may, for example, include an LCD display, a CRT-type display terminal, a series of LEDs, audible indicators, or other suitable operator interface devices.

Cab ignition switch 70, in one illustrative embodiment, is a simple key switch, which, when turned or closed, provides power (through attachment control logic circuit 86) to machine start/ignition system 78. In response, machine start/ignition system 78 cranks the engine in skid steer loader 10 to start the engine.

Hydraulic power circuit 82, in one illustrative embodiment, includes a source of hydraulic fluid under pressure. Such a source can, for example, include a pump driven based on power generated by the engine of skid steer loader 10. Hydraulic power circuit 82 also preferably includes a main hydraulic valve which can be actuated to provide hydraulic fluid under pressure to the various actuators and couplings, and other valves, on skid steer loader 10.

Power control circuit 80, in one illustrative embodiment, includes an electrical power system for machine 10. Such a system can be implemented in any suitable way, including those set out in the patents and patent applications incorporated herein by reference. In one illustrative embodiment, power control circuit 80 can be controlled (based on operator inputs through electronic controls 66) to control the hydraulic power circuit 80 in a pulse width modulated, or continuous fashion. In such an embodiment, power control circuit 80 provides an output to control machine actuator valves 84, which are controlled to selectively provide hydraulic fluid under pressure to machine actuators 60.

When in a continuous or pulse width modulation operation mode, power control circuit 82 receives inputs from electronic controls 66 (through attachment control logic circuit 86) and provides a continuously variable signal to machine actuator valves 84 to control flow through valves 84 in a continuously variable fashion. In an on/off operation mode, power control circuit 80 receives operator inputs from electronic controls 66 (through attachment control logic 86) and controls valves 84 in an on/off fashion, either allowing full flow through the valves, or completely blocking flow through the valves.

In either case, hydraulic fluid under pressure is provided from valves 84 to actuator 60.

Machine actuator valves 84 also include valves for providing hydraulic fluid under pressure to traction motors used for driving wheels 16, and any other power actuators associated with machine 10.

Machine interlock controller 72, in conjunction with machine traction lockout system 74 and machine actuator lockout system 76 are used in modifying the functionality of machine 10. In one illustrative embodiment, machine actuator lockout system 76 is used to lockout or modify the operation of certain of the machine power actuators 60 associated with machine 10. Similarly, machine traction lockout system 74 preferably locks out or modifies the operation of the traction motors used to drive wheels 16 (or other traction devices such as tracks used on a miniexcavator). The lockout systems are used under certain conditions which may be sensed by operating condition sensors 64, which may be input by the operator through electronic controls 66, or which may be communicated to machine interlock controller 72 through attachment control logic circuit 86.

In one illustrative embodiment, machine actuator lockout system 76 includes a valve, or an electronic circuit or other suitable mechanism, for locking out the operation of one or more machine actuators 60. Machine traction lockout system 74 includes a valve or valve arrangement, an electronic circuit, or another suitable mechanism, for locking out or modifying the operation of the traction motors used in driving wheels 16.

Systems 74 and 76 are controlled based on outputs from controller 72. For instance, when controller 72 is not powered up, lockout mechanism 74 and 76 are disposed in a lockout configuration precluding operation of the associated actuators and traction mechanisms. However, once controller 72 is powered up, and during normal operation when controller 72 has received an indication that an operator is in seat 20 with seat bar 22 in the lowered position, controller 72 unlocks lockout systems 74 and 76, allowing functionality of the hydraulic system on loader 10. However, if the operator raises seat bar 22 or gets out of seat 20, operating condition sensors 64 provide suitable signals to machine interlock controller 72 causing controller 72 to implement lockout conditions by manipulating lockout systems 74 and 76 to lock out operation of selected hydraulic functions. Controller 72 then provides an operator observable indication at operator interface 68 indicating the lockout conditions which have been implemented.

Remote attachment control device 52 preferably includes an operator interface 90 (which is discussed in greater detail in FIG. 3) by which an operator can provide inputs to control device 52 which, in turn, provides inputs to attachment control logic circuit 86. Based on the inputs provided by the operator through interface 90, under certain circumstances described in greater detail below, the operator can initiate operation of certain functions in loader 10 from control device 52, thereby allowing the operator to implement certain control of attachment 12.

As is described in greater detail below, if the operator starts loader 10 from control device 52, attachment control logic circuit 86 renders substantially all functions previously performable from within cab 18, inoperable. While an operator can still shut down loader 10 and attachment 12 from within cab 18, all other functions are inoperable.

In addition, when the operator starts loader 10 from control device 52, the operator can also control the provision of hydraulic fluid under pressure, through the base valve and hydraulic power circuit 82, and through attachment solenoid valve 48, to attachment actuator 62. In that instance, attachment control logic circuit 86 implements the necessary logic to deliver hydraulic fluid under pressure to attachment solenoid valve 48, and attachment actuator 62, as requested by the operator through interface 90 and control device 52.

Further, as will be described in greater detail below, if the operator starts loader 10 from device 52, machine interlock controller 72 is never powered up. Thus, the machine lockout system 74 and 76 remain in the lockout position thereby locking out the predesignated actuators and traction mechanisms on skid steer loader 10. In other words, in one illustrative embodiment, when operation of skid steer loader 10 and attachment 12 is initiated through control device 52 and interface 90, the only thing which the operator can control is the provision of hydraulic fluid through valve 48 to attachment actuators 60, and the starting and stopping of the engine in loader 10. Substantially all other functions of loader 10 are locked out.

FIG. 3 is an illustration of operator interface 90, discussed in FIG. 2. Interface 90 includes stop switch 100, attachment on/off switch 102, key switch 104, and visual indicator light 106. In one illustrative embodiment, engine start switch 104 operates substantially the same as a conventional key switch. Switch 104 is rotated to the extreme right in order to start the engine in loader 10 from control device 52. Once the engine is running, engine start switch 104 remains in the run position illustrated in FIG. 3. Stop button 100, in one illustrative embodiment, is a detente button which can be actuated simply by depressing the button, and can be de-actuated only by twisting the button clockwise. Thus, when the operator wishes to stop all operations of loader 10 and attachment 12, the operator simply depresses button 100. The loader 10 and attachment 12 cannot be restarted until the operator twists button 100 clockwise and allows the button to resume its undepressed position.

Attachment on/off switch 102, in one illustrative embodiment, is a momentary rocker switch which can be rocked upwardly or downwardly, as oriented in FIG. 3. When rocked upwardly, rocker switch 102 causes hydraulic fluid under pressure to be delivered to the attachment. When rocked downwardly, switch 102 causes hydraulic fluid under pressure to be blocked from delivery to the attachment. When hydraulic fluid is being delivered to the attachment, switch 102 preferably includes a visual indicator on the upper portion thereof (such as an LED) which is lighted. The LED is preferably turned off when rocker switch 104 is turned off.

Visual indicator light 106 is also preferably an LED. Indicator light 106 is, in one illustrative embodiment, used to indicate to the operator that interface 90 is non-functional (except for stop switch 100). Therefore, and as is discussed in greater detail below, if the operator starts the engine of loader 10 from within cab 18, or if the operator depresses switch 100 and has not yet rotated switch 100 to allow it to resume its undepressed position, indicator light 106 is lighted. This indicates that neither rocker switch 102 nor engine start switch 104 are operable on interface 90. In all other cases where switches 102 and 104 are operable, LED 106 is not lighted.

Figure 4:
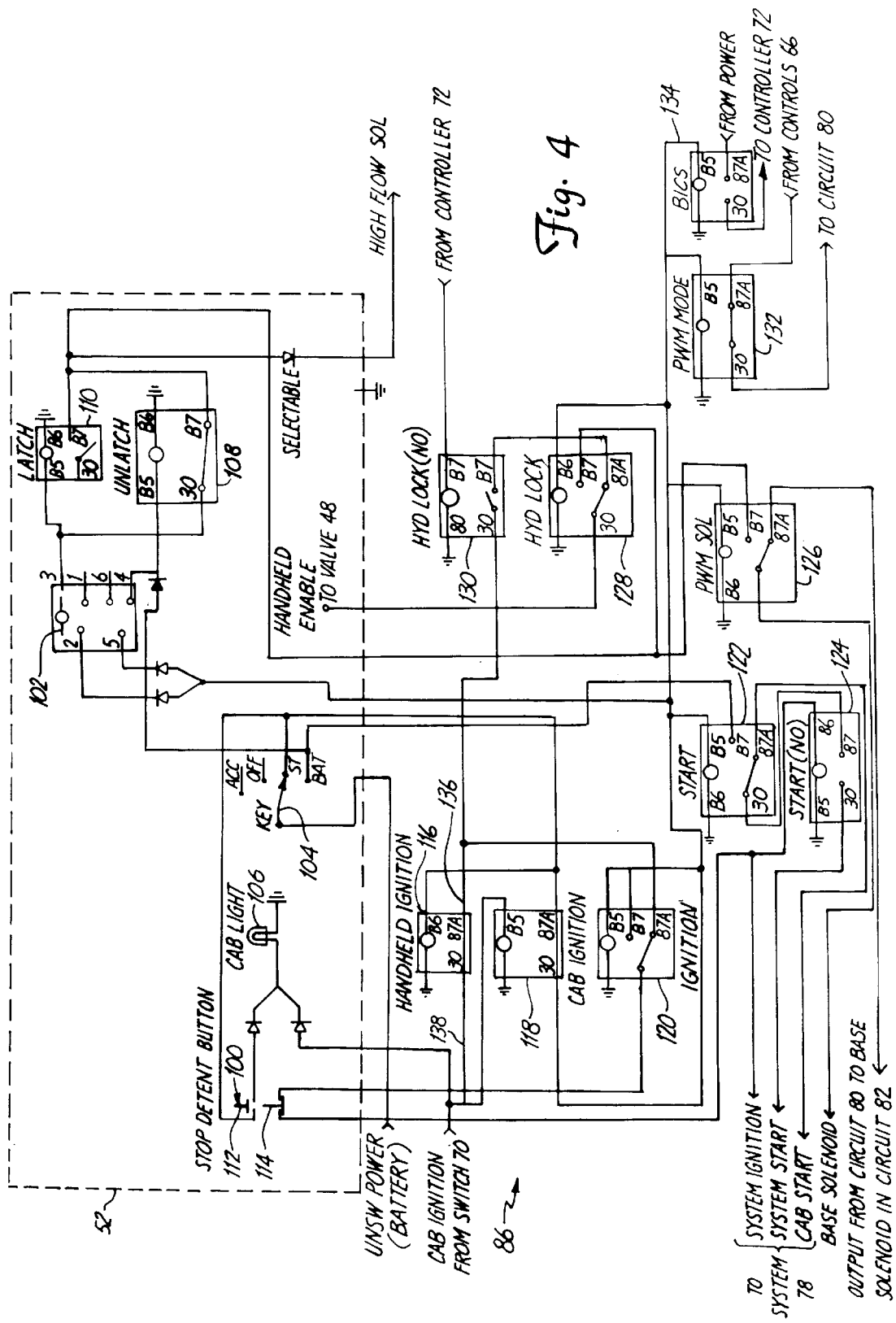
FIG. 4 is a more detailed diagram of an attachment control logic circuit as shown in FIG. 2.

FIG. 4 is a schematic diagram illustrating control device 52, including the items of interface 90, and attachment control logic circuit 86. In addition to the items described with respect to FIGS. 2 and 3, FIG. 4 shows that remote attachment control device 52 includes first and second latches 108 and 110 which are coupled to rocker switch 102. FIG. 4 also illustrates that stop button 100 includes two sets of contacts 112 and 114, respectively, which make or break contact between two associated sets of conductors. In addition, FIG. 4 illustrates that attachment control logic circuit 86 implements logic using relays 116–134.

The discussion will now proceed with respect to two-modes of operation. In the first mode, the operator starts the engine of loader 10 from remote attachment control device 52 and controls attachment 12 from control device 52, outside cab 18. In the second mode of operation, referred to as two-person operation, one operator resides in seat 20 in cab 18, with seat bar 22 in the lowered position. That operator starts the engine of loader 10, while the other operator is available at attachment 12. The operator within cab 18 is responsible for controlling the flow of hydraulic fluid to attachment 12, while the second operator can access control device 52 in order to shut down loader 10 and attachment 12.

Control From Remote Attachment Control Device 52

Prior to beginning operation from control device 52, an operator preferably first resides within cab 18 and lowers lift arm 28 to a desired position and also manipulates the tilt cylinder to position attachment 12 in a desired position. The operator then sets the engine speed control to idle, or another appropriate engine speed level. Next, the operator stops the engine in controller 10 and engages a parking brake, or other similar device. The operator then raises seat bar 28 and leaves the cab 18 of loader 10. It should be noted that, once loader 10 has been shut down, machine interlock controller 72 (shown in FIG. 2) no longer has power supplied. Thus, machine traction lockout system 74 and machine actuator lockout system 76 are in the lockout positions in which the desired actuators on loader 10, and the traction mechanism on loader 10, are locked and non-functional.

Next, the operator accesses control device 52 and ensures that switch 100 is in the non-engaged (or un-depressed) position shown in FIG. 4. In that position, contactor 114 is closed to make contact between its associated pair of conductors, while contact 12 is open to break contact between its associated pair of conductors.

Next, the operator turns key 104 to the start position shown in FIG. 4. This applies battery power to the start pin and also to relays 116 and 118, as shown. This energizes relay 116, causing it to open. Since the cab ignition switch from switch 70 has not been energized, relay 118 is not energized and remains closed. Thus, battery power is also supplied through the energization inputs of relays 120, 122, 124, 128, 132 and 134.

With relay 120 energized, the contacts switch positions from that shown in FIG. 4, thus coupling battery power through contactor 114 in stop button 100, and out to the system ignition. Similarly, this energizes relay 124 causing its contacts to close. The battery power also energizes relay 122 which causes its contacts to switch from the position shown in FIG. 4, thus coupling the battery signal from keyswitch 104, through relay 122 and through now closed relay 124, to the system start. Since relay 122 has switched positions from that shown in FIG. 4, the cab start signal provided to system 78 is open circuited.

The battery power applied to energize relay 126 causes it to switch positions from that shown in FIG. 4. This causes the output to the base solenoid in power circuit 82 (shown in FIG. 2) to originate from rocker switch 102. The operation of rocker switch 102 is described in greater detail below.

The power supplied to energize relay 132, in the illustrative embodiment shown in FIG. 4, causes relay 132 to open. This precludes remote control circuit 80 (shown in FIG. 2) from operating hydraulic power circuit 82 in the pulse width modulated (or continuously variable) fashion. Similarly, since relay 134 is energized, it opens. This precludes power from being applied to interlock controller 72 (shown in FIG. 2). Therefore, both the machine actuator lockout system 76 and machine traction lockout system 74 will remain in the locked configuration.

Battery power is also supplied to energize relay 128. This causes the contacts to switch position from that shown in FIG. 4 such that the output to valve 48 (which, in one illustrative embodiment, travels through control device 52) to originate from attachment on/off rocker switch 102.

With circuits 52 and 86 configured in this way, the output to the base solenoid in hydraulic power circuit 82 and the output to attachment solenoid valve 48 shown in FIG. 2 are both controlled by rocker switch 102. When rocker switch 102 is shifted to the on position, relays 108 and 110 act as a latch to maintain the signal exiting relay 110 in the on state. This signal is provided through relay 128 to valve 48 causing valve 48 to open. This signal is also provided through relay 126 to the base solenoid valve (or main valve) in hydraulic power circuit 82. Thus, hydraulic fluid under pressure is provided through the main valve and attachment solenoid valve 48, to attachment actuators 62.

Relays 108 and 110 act to latch the signal in the following manner. When switch 102 is moved to the on state, power is supplied to energize latch 110, causing its contacts to switch position from that shown in FIG. 4. This causes power to be supplied through relay 110, relays 126 and 128, as described above. This also, however, supplies power through relay 108, back to the input of relay 110, which maintains relay 110 in the energized position.

However, when switch 102 is switched to the off position, relay 110 is de-energized such that power is no longer supplied at its output. Thus, power is removed from the inputs to relays 126 and 128, and is also removed from the input of relay 110, through relay 108.

Thus, it can be seen that, with circuits 52 and 86 in this state, the operator of attachment 12 can cause hydraulic fluid to flow to attachment 12 (and its associated actuators) simply by rocking switch 102 to the attachment "on" position. Similarly, the operator of attachment 112 can remove hydraulic fluid under pressure from attachment 12 (and its associated actuators) simply by rocking switch 102 to the attachment "off" position.

Similarly, by rotating key 104 to the off position, power is also removed from the appropriate latches to de-energize the outputs to the base solenoid and hydraulic power circuit 82, and to the solenoid valve 48, thus closing those two valves and removing hydraulic power from the attachment actuators. Similarly, rotating key 104 to the off position will remove power from the system ignition signal causing the engine in loader 10 to stop running. This also de-energizes relay 124 in which prevents starting or cranking of the engine.

When the operator is controlling attachment 12 through control device 52, stop button 100 can also be used to shut down both attachment 12 and loader 10. In order to do this, the operator simply depresses button 100. This causes contactor 112 to close, and causes contactor 114 to open. By closing contact 112, power is applied to indicator light 106 causing it to become illuminated on interface 90. In addition, breaking contact 114 causes the system ignition signal to become de-energized, thus de-energizing relay 124. This precludes the engine from being started. Breaking contact 114 also removes power from the system ignition which causes the engine to stop running.

Similarly, if the operator is controlling attachment 12 from control device 52, turning the ignition key in cab 18 also causes the engine in loader 10 to stop. If the cab ignition signal from switch 70 becomes active, relay 118 is energized thus opening its associated contacts. This causes power to be removed from relays 122, 126, 128, 132 and 134. This also causes relay 120 to become de-energized. Thus, the system ignition switch is de-energized, as is the system start switch. This causes the engine in loader 10 to stop running. Similarly, with the cab ignition switch energized, light indicator 106 becomes illuminated on interface 90.

Thus, it can be seen that once the operator starts the engine in loader 10 from control device 52, the operator can control the flow of hydraulic fluid under pressure to attachment 12 simply by actuating rocker switch 102. However, if the operator turns off key 104, depresses stop switch 110, or attempts to start the engine by turning the key switch in cab 18, all of these actions will cause the engine in loader 10 to stop running, and will result in the removal of hydraulic fluid under pressure from attachment 12.

Two-Person Operation

In the two-person operation, the first operator starts loader 10 from inside cab 18 and controls the provision of hydraulic fluid under pressure to attachment 12. The second operator resides outside cab 18 and is available to access attachment 12, and to stop attachment 12 by depressing stop button 100 on control device 52.

The first operator (the operator inside cab 18) first lowers lift arm 28 and tilts attachment 12 to a desired angle. The first operator then moves the throttle such that the engine speed is at a desired level, such as idle. The first operator then engages a parking brake for loader 10, and remains in seat 20 with seat bar 22 in the lowered position.

When the operator starts the engine from within cab 18, the cab ignition signal from switch 70 is supplied with power. This causes power to be applied to indicator light 106 to become illuminated on interface 90 of control device 52. Relay 118 is energized, causing it to open. This precludes power from being applied to engine relays 120, 122, 126, 128, 132 and 134, such that the relays are in the non-energized position shown in FIG. 4. Since relay 116 is closed, the high signal from switch 70 is also applied, through relay 120, and through switch 114, to relay 124, energizing relay 124. Thus, when the system ignition signal is powered, relay 124 closes allowing the system start and cab start signals to be connected to one another through relays 122 and 124. This causes the engine in loader 10 to start Further, since relay 126 is in the non-energized position shown in FIG. 4, the output from power control circuit 80 to the main solenoid in hydraulic power circuit 82 simply passes through relay 126. Similarly, since relays 132 and 134 are in the non-energized position illustrated in FIG. 4, the power signal to controller 72 is applied to controller 72 and simply passes through relay 134, while the pulse width modulation selection signal from electronic controls 66 to power control circuit 80 is applied to power control circuit 80 by simply passing through relay 132.

Since interlock controller 72 is powered up, and since the operator is in seat 20 with the seat bar 22 in the lowered position, the traction lockout system 74 and machine actuator lockout system 76 are unlocked. The signal provided by controller 72 to the actuator lockout system 76 is also provided to relay 130 in attachment control logic circuit 86. This energizes relay 130 and cause the relay to close, thus coupling the power applied from the cab ignition signal, through relay 130, through relay 128, and to valve 48. This causes valve 48 to open to allow hydraulic fluid under pressure to flow to attachment actuator 62.

If the second operator, residing outside of cab 18, depresses button 100, contactor 114 opens thus de-energizing relay 124, such that it opens. This disconnects the system start and cab start signals thus preventing the engine in loader 10 from being started. This also removes the signal from system ignition causing the engine to stop.

Similarly, if the engine is started from within cab 18, and switch 104 is turned to the start position, this energizes relay 116, thus opening relay 116 and causing the signal through relay 120 to assume a low level, thus removing system ignition, and shutting down loader 10.

It can thus be seen that if loader 10 is started from within cab 18, all of the functions in control device 52 and interface 90 are not functional, except stop button 100.

Thus, it can be seen that the present invention provides a system which allows operation of attachments 12 from outside operator cab 18. In one illustrative embodiment of the present invention the operator is allowed to start and run loader 10, while it remains stationary, as well as to selectively allow hydraulic fluid flow to attachment 12. If the engine of loader 10 is started from the remote attachment control device, all functions within the cab are disabled, except the stop button. In addition, if the key in the cab is turned once the loader 10 has already been started from the remote attachment control device, this also shuts down machine 10. In addition, the present invention provides a two-person operation mode in which one operator is located inside the cab 18 of loader 10, seated on seat 20, with seat bar 22 in the lowered position. A second operator is located outside of the cab 18, in the area of attachment 12. When machine 10 is started from within the cab, all functions on the remote attachment control device are disabled, other than the stop button. Also, if the second operator attempts to start the machine from the remote attachment control device after it has already been started from within cab 18, the engine is stopped.

It should also be noted that the present invention can be used with a hand held attachment. In such an embodiment, once valve 48 has been opened, even in the two-person operation mode, the second operator operating the hand held tool may control the provision of hydraulic fluid to the hand held tool, such as through a trigger or other device located on the hand held tool which controls a valve on the hand held tool. However, the availability of hydraulic fluid to the hand held tool, through valve 48, is still controlled by the first operator who resides within cab 18.

Although the present invention has been described with reference to preferred embodiments, workers skilled in the art will recognize that changes may be made in form and detail without departing from the spirit and scope of the invention.

What is claimed is:

1. A power machine having a frame with an operator compartment, an engine, traction members for driving the machine, and a plurality of power actuators, and further comprising:
    an electrical power circuit;
    a hydraulic power circuit coupled to the plurality of power actuators through a plurality of actuator valves;
    a first ignition switch in the operator compartment operably coupled to the engine;
    an attachment having an attachment actuator coupled to the hydraulic power circuit to receive hydraulic fluid under pressure;
    a first hydraulic control input mechanism disposed within the operator compartment and coupled to the hydraulic power circuit to control provision of hydraulic fluid to the attachment; and
    an attachment control device disposed outside the operator compartment and including a second ignition switch operably coupled to the engine and a second hydraulic control input coupled to the hydraulic power circuit to control provision of hydraulic fluid to the attachment;
    wherein the attachment control device is configured such that the second hydraulic control input is non-functional when the engine is started with the first ignition switch.

2. The power machine of claim 1 wherein the attachment control device is configured such that the first hydraulic control input is non-functional when the engine is started with the second ignition switch.

3. The power machine of claim 1 wherein the power machine includes a first stop input mechanism configured, when actuated, to stop the engine and wherein the attachment control device includes a second stop input mechanism configured, when actuated, to stop the engine, and wherein the attachment control device is configured such that the first and second stop buttons are functional regardless of whether the engine is started with the first or second ignition switch.

4. The power machine of claim 1 wherein the attachment control device is configured to stop the engine when the engine was started with one of the first and second ignition switches and another of the first and second ignition switches is actuated.

5. The power machine of claim 1 and further including:
a plurality of operating condition sensors providing sensor signals indicative of sensed operating conditions; and
an interlock controller operably coupled to the plurality of power actuators to unlock operation of selected ones of the plurality of power actuators based on the sensor signals.

6. The power machine of claim 5 wherein the power machine includes a seat and a movable seat bar, and wherein the plurality of operating condition sensors comprise:
a seat sensor sensing occupancy in the seat; and
a seat bar sensor sensing seat bar position.

7. The power machine of claim 6 wherein the attachment control device is configured to preclude the interlock controller from unlocking the plurality of power actuators when the engine is started with the second ignition switch.

8. The power machine of claim 7 wherein the attachment control device is configured to inhibit the interlock controller from receiving power from the electrical power circuit when the engine is started with the second ignition switch.

9. The power machine of claim 8 wherein the interlock controller enables operation of the first hydraulic control input when the seat sensor indicates the seat is occupied and the seat bar sensor indicates the seat bar is in an operator present position.

10. The power machine of claim 9 wherein the power machine includes a lift arm and wherein the plurality of power actuators comprises lift cylinders coupled to the lift arm and a hydraulic traction motor coupled to the traction members.

11. The power machine of claim 1 wherein the attachment control device is mounted to the frame of the power machine.

12. The power machine of claim 1 wherein the attachment control device is mounted to the attachment.

13. An attachment for a power machine of the type having a frame with an operator compartment, an engine, traction members for driving the machine, an electrical power circuit, a hydraulic power circuit coupled to a plurality of power actuators through a plurality of actuator valves, a first ignition switch in the operator compartment operably coupled to the engine, and a first hydraulic control input mechanism disposed within the operator compartment and coupled to the hydraulic power circuit to control provision of hydraulic fluid, the attachment comprising:

an attachment actuator disconnectably coupleable to the hydraulic power circuit to receive hydraulic fluid under pressure; and
an attachment control device disposed outside the operator compartment and including a second ignition switch operably coupled to the engine and a second hydraulic control input coupleable to the hydraulic power circuit to control provision of hydraulic fluid to the attachment;
wherein the attachment control device is configured such that the second hydraulic control input is non-functional when the engine is started with the first ignition switch.

14. The attachment of claim 13 wherein the attachment control device is configured such that the first hydraulic control input is non-functional when the engine is started with the second ignition switch.

15. The attachment of claim 13 wherein the power machine includes a first stop input mechanism configured, when actuated, to stop the engine and wherein the attachment control device includes:
a second stop input mechanism configured, when actuated, to stop the engine, and wherein the attachment control device is configured such that the first and second stop buttons are functional regardless of whether the engine is started with the first or second ignition switch.

16. The attachment of claim 13 wherein the attachment control device is configured to stop the engine when the engine is running, having been started with one of the first and second ignition switches, and another of the first and second ignition switches is actuated.

17. The attachment of claim 13 wherein the power machine includes a plurality of operating condition sensors providing sensor signals indicative of sensed operating conditions and an interlock controller operably coupled to the plurality of power actuators to unlock operation of selected ones of the plurality of power actuators based on the sensor signals and wherein the attachment control device is configured to preclude the interlock controller from unlocking the plurality of power actuators when the engine is started with the second ignition switch.

18. The attachment of claim 17 wherein the attachment control device is configured to inhibit the interlock controller from receiving power from the electrical power circuit when the engine is started with the second ignition switch.

19. The attachment of claim 17 wherein the power machine includes a lift arm and wherein the plurality of power actuators comprises lift cylinders coupled to the lift arm and a hydraulic traction motor coupled to the traction members.

20. The attachment of claim 13 wherein the attachment control device is mounted to the frame of the power machine.

* * * * *